US008287421B2

(12) United States Patent
Ciszak et al.

(10) Patent No.: US 8,287,421 B2
(45) Date of Patent: Oct. 16, 2012

(54) TRANSMISSION AND POWER GENERATION SYSTEM HAVING TORQUE REACTING JOINT

(75) Inventors: Robert John Ciszak, Fairview, PA (US); Keith Marsden, Erie, PA (US); Dennis Roy, Fairview, PA (US); Steven Owens, Waterford, PA (US)

(73) Assignee: General Electric Company, Schenectady, NY (US)

( * ) Notice: Subject to any disclaimer, the term of this patent is extended or adjusted under 35 U.S.C. 154(b) by 860 days.

(21) Appl. No.: 12/336,361

(22) Filed: Dec. 16, 2008

(65) Prior Publication Data
US 2010/0007150 A1   Jan. 14, 2010

Related U.S. Application Data

(60) Provisional application No. 61/079,743, filed on Jul. 10, 2008.

(51) Int. Cl.
   *F16H 57/08*   (2006.01)
(52) U.S. Cl. ........................................................ 475/331
(58) Field of Classification Search .................. 475/331, 475/317, 149, 150, 156; 290/40 C, 40 B, 290/40 A, 55; 74/606 R, 607; 464/170, 177; 180/380; 403/300, 364
See application file for complete search history.

(56) References Cited

U.S. PATENT DOCUMENTS

| | | | | |
|---|---|---|---|---|
| 3,880,267 A | * | 4/1975 | Auble et al. | 192/108 |
| 4,590,820 A | * | 5/1986 | Hambric | 74/640 |
| 6,759,758 B2 | | 7/2004 | Torres Martinez | |
| 7,160,083 B2 | * | 1/2007 | Pierce et al. | 416/61 |
| 7,323,792 B2 | | 1/2008 | Sohn | |
| 7,335,128 B2 | * | 2/2008 | Flamang et al. | 475/331 |
| 7,416,505 B2 | * | 8/2008 | Downs | 475/204 |
| 7,431,567 B1 | | 10/2008 | Bevington et al. | |
| 7,445,575 B2 | * | 11/2008 | Capito | 475/204 |
| 7,806,799 B2 | * | 10/2010 | Smook et al. | 475/344 |
| 7,936,050 B2 | * | 5/2011 | Shin | 257/634 |

* cited by examiner

*Primary Examiner* — David D Le
*Assistant Examiner* — David J Hlavka
(74) *Attorney, Agent, or Firm* — Shawn McClintic; Alleman Hall McCoy Russell & Tuttle LLP

(57) ABSTRACT

A transmission, including a gear-train and an outer housing enclosing the gear-train, the outer housing including a torque reacting joint coupling a first section of the transmission to a second section of the outer housing, the torque reacting joint including mating indents between the first and second sections.

21 Claims, 6 Drawing Sheets

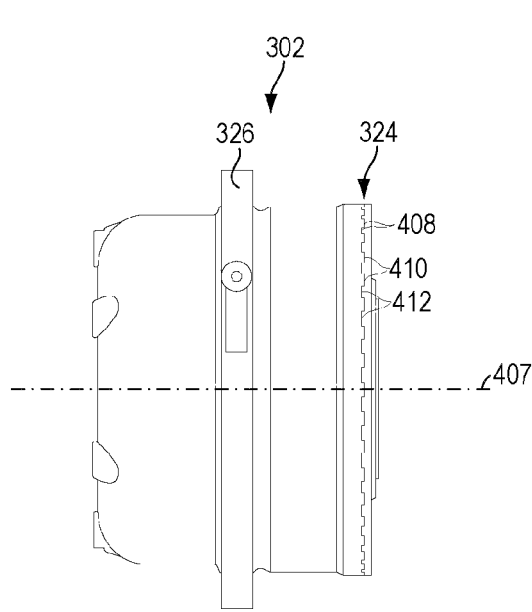
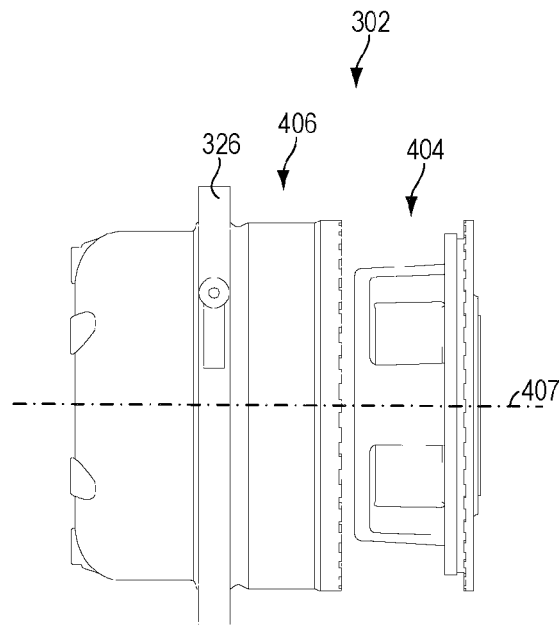
FIG. 4A    FIG. 4B
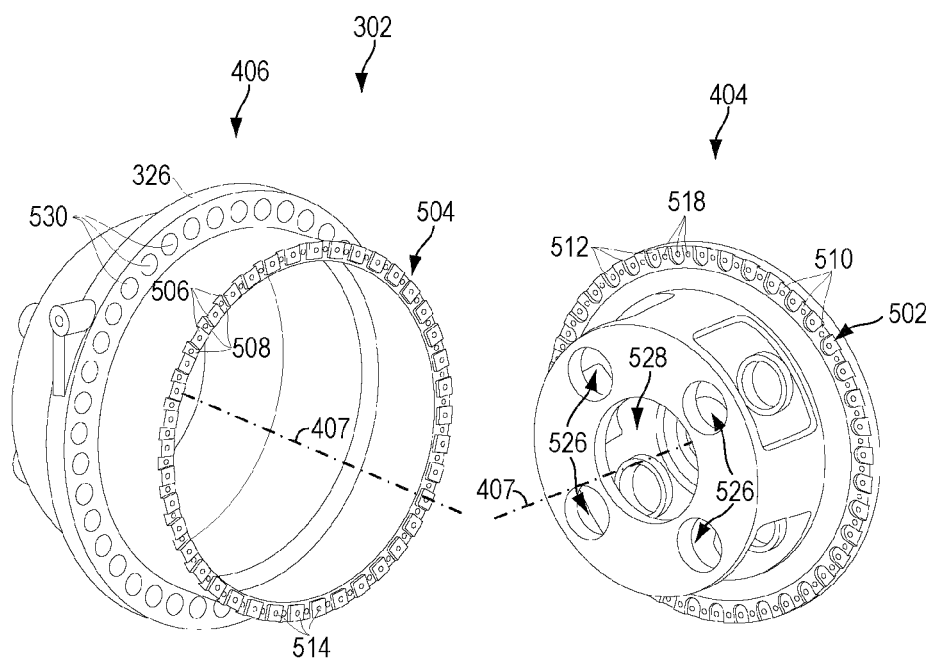
FIG. 5A    FIG. 5B

TRANSMISSION AND POWER GENERATION SYSTEM HAVING TORQUE REACTING JOINT

CROSS REFERENCE TO RELATED APPLICATIONS

The present application claims priority to U.S. Provisional Patent Application Ser. No. 61/079,743 entitled "Structural Joint for High Torque Transmission in a Wind Turbine Gearbox", filed Jul. 10, 2008, the disclosure of which is hereby incorporated by reference.

BACKGROUND

The wind turbine industry has been experiencing unprecedented growth in recent years due to the demand for clean, renewable energy. Small and efficient design has been a central objective of the wind turbine industry to reduce the cost of the wind turbine and in some cases increase the turbine's efficiency. However, small and efficiently designed wind turbines may be difficult to achieve for a multitude of reasons.

Wind turbines typically include a transmission, such as a gearbox, to transfer and adjust power from turbine blades to a generator. Specifically, the transmission adjusts the speed and the torque from the rotor blades, allowing energy to be efficiently generated in the generator of the wind turbine. However, not only does the transmission transfer the wind generated input to an electric machine for power generation, but it also reacts the wind-generated input torque by an equal and opposite reaction torque. This reaction torque is generally proportional to the size and power output of the turbine. Thus, as the size and power output is increased, the reaction torque is also increased. As such, as the power generated by wind turbines continues to rise, so does the reaction torque that is provided by the transmission, thus frustrating the goal of maintaining a small and efficient wind turbine design.

In the past, attempts have been made to increase the size of various coupling hardware, such as bolts, in the transmission housing to compensate for the increased reaction torque carried by the transmission. Likewise, the overall size of the transmission housing may also be increased to compensate for the increased reaction torque. However, in some transmission designs, such as differential planetary gearboxes, the size of the coupling hardware may be restricted due to location, size, etc., of other components included in the transmission. Further, requirements related to locating, packaging, and servicing the transmission in the wind turbine, and properly installing and mounting the transmission to the wind driven blades and the electric power generation units, may also limit the ability to increase the coupling elements of the transmission housing and/or the size of the transmission housing.

BRIEF DESCRIPTION OF THE INVENTION

The inventors have recognized the above issues as well as solutions to the above issues. In one approach, a transmission comprises a gear-train and an outer housing enclosing the gear-train, the outer housing including a torque reacting joint coupling a first section of the transmission to a second section of the outer housing, the torque reacting joint including mating indents between the first and second sections.

In this way, by carrying the reaction torque substantially via the mating indents, it is possible that coupling hardware size, as well as transmission housing size, can be reduced. Further, by carrying the reaction torque substantially via the mating indents, the mating surfaces of the first and second sections of the outer housing are more free to flex and/or deform, thus more evenly distributing the reaction load and improving radial alignment of the gear-train in the gearbox.

This brief description is provided to introduce a selection of concepts in a simplified form that are further described below in the Detailed Description. This brief description is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF FIGURES

The present invention will be better understood from reading the following description of non-limiting embodiments, with reference to the attached drawings, wherein below:

FIGS. 4A and 4B show a detailed view of a torque reacting joint, according to an embodiment of the present invention;

FIGS. 5A and 5B shows an exploded view of the torque reacting joint illustrated in FIGS. 4A and 4B, including a housing mating surface and a gear-train mating surface;

DETAILED DESCRIPTION

Figure 1:
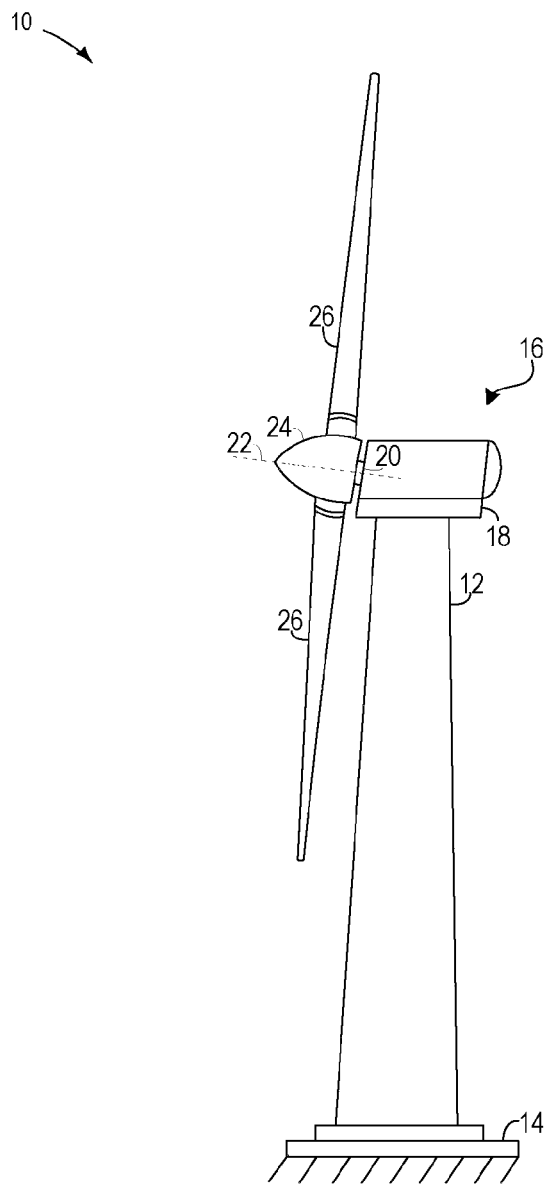
FIG. 1 shows an illustration of a power generating wind turbine.
Figure 2:
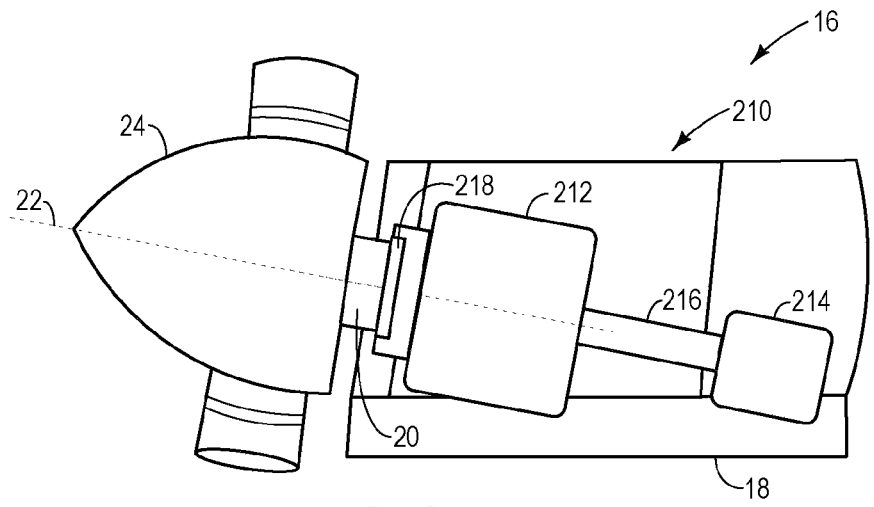
FIG. 2 illustrates a schematic depiction of a nacelle included in the power generating wind turbine shown in FIG. 1.

A transmission for a wind turbine is described herein. The transmission includes a torque reacting joint configured to react torque generated by the wind interacting with the turbine blades. The torque reacting joint may be configured to react a substantial amount of the wind-generated torque while maintaining a compact and efficient design using mating indents in a housing of the transmission. FIGS. 1-2 describe an example wind turbine operating environment in which the torque reacting joint may be used, although it may also be used in other power transmission applications. Further, various views illustrating example torque reacting joints are shown in FIGS. 3-11.

A power generating wind turbine 10 is shown in FIG. 1. The turbine includes a tower 12 extending substantially vertically out of a base 14. The tower may be constructed from a plurality of stacked components. However, it can be appreciated that alternate configurations of the tower are possible, such as a lattice tower. A nacelle 16 and nacelle bedplate 18 are positioned atop the tower. A drive unit (not shown) may be included in the nacelle bedplate, allowing the nacelle to rotate about a horizontal plane. The nacelle may be positioned, by the drive unit, directly into the wind, increasing the power output of the wind turbine. Further in some examples, a pitch unit controls the vertical pitch of the blades. The nacelle houses a power generation system having a transmission and a generator, shown in FIG. 2 discussed in greater detail herein. Further, various power electronics and control electronics may be housed in nacelle 16.

As used herein, the wind turbine is positioned with the rotor pointed into the wind, and thus upwind refers to a longitudinal direction pointing from the generator toward the rotor blades and downwind refers to the opposite direction. Furthermore, upwind and downwind components may be used to define the relative position of components included in the wind turbine.

Continuing with FIG. 1, a main shaft 20 extends out of the nacelle. The main shaft may be coupled to a transmission by an input carrier (not shown) sharing a common central axis 22 with the main shaft. Furthermore, the main shaft 20 may be coupled to a rotor head 24. A plurality of rotor blades 26 may be radially position around the rotor head 24. A wind force (not shown) may act on the rotor blades, rotating the blades and therefore the rotor head about the central axis. Thus, the rotor head may be wind driven. The rotor head may also be configured to reduce drag on the wind turbine, thereby reducing the axial load (e.g. thrust load) on bearings in the wind turbine.

FIG. 2 shows a detailed illustration of the nacelle 16 housing a transmission 212 included in a power generation system 210 of the wind turbine 10. The power generation system 210 is configured to efficiently convert rotational energy from wind driven rotor blades to electrical energy. The power generation system may include the transmission 212 configured to increase the rotational speed of the main shaft 20 and a generator 214 configured to convert mechanical energy from the transmission into electrical energy. The transmission may include an input and an output. The input is configured to transfer rotation from the main shaft to a gear-train (not shown in this figure) and the output is configured to transfer rotation from the transmission to the generator. The transmission is configured to adjust the speed and/or torque of the rotational input from the wind actuated rotor head, allowing the generator to more efficiently utilize the rotational energy from the transmission to extract electrical power from the power generation system. For instance, the transmission may increase the rotational speed of the input, while reducing torque.

A number of suitable transmissions having an input and an output, which may be axially aligned, can be utilized. Specifically, in this example, a differential planetary transmission is used. Various types of generators may be coupled to the transmission to produce power in the wind turbine, such as an induction type, wound type, synchronous type, secondary resistance control wound induction type (rotor current control or RCC type), secondary excitation control wound induction type (static Scherbius or D.F. type), permanent magnet type, induction multiple type, etc. Additionally, the generator may be coupled to an electrical transmission system, which may be routed through the tower to the base of the wind turbine.

It can be appreciated that additional up-tower components may be included in the nacelle such as electrical transmission components including but not limited to a transformer, a generator cooling system such as an open or closed loop heat exchanger, a transmission lubrication system, etc.

Figure 3:
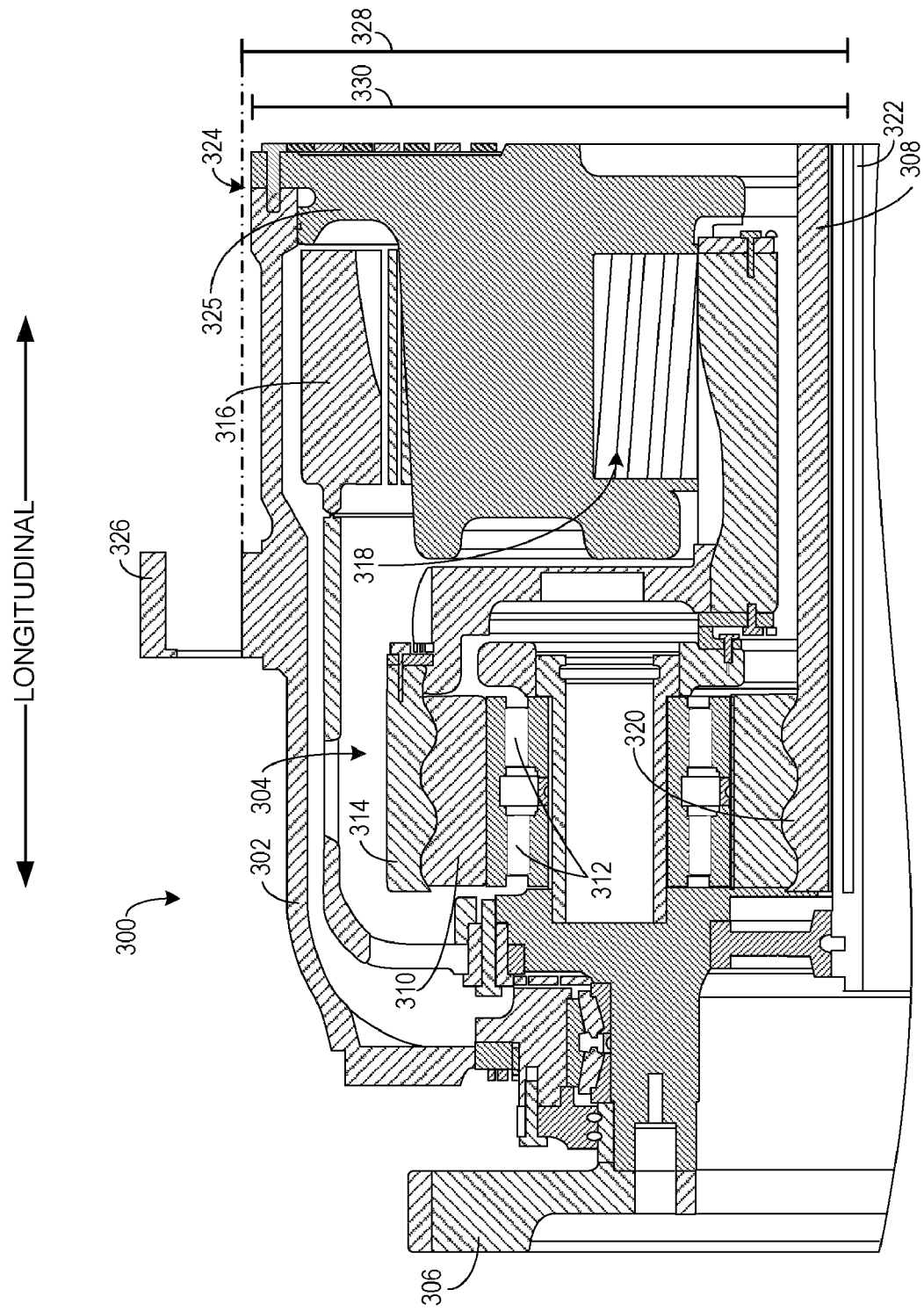
FIG. 3 shows a cut away view of a transmission included in a wind turbine, according to an embodiment of the present invention.

FIG. 3 shows a cut-away side view of a transmission 300. In some examples, transmission 300 may be similar to transmission 212. However, in other examples, the transmission 300 may be another suitable transmission. The transmission 300 may be configured to increase the speed of the rotational input from the rotor blades, reducing the torque. The transmission 300 may include an outer housing 302 and a gear-train 304. In some examples, the outer housing may at least partially enclose a gear-train and/or a portion of the transmission. Additionally, the gear-train may include an input carrier 306 and an output shaft 308, forming a transmission input and output, respectively. The input carrier may receive rotational input from the rotor blades and the output shaft may transfer rotational output to a generator. It can be appreciated that in other examples, alternate inputs and outputs may be utilized.

As noted above, the transmission may be a differential planetary transmission including two power paths. The first power path includes an attachment between the input carrier 306 and a plurality of upwind planet gears 310. The input carrier may be directly coupled to a pinion of each respective planet gear. Each planet gear may include one or more bearings 312 or bearing sets, allowing the planet gears to rotate. A first ring gear 314 may be in engagement with the upwind planet gears, facilitating proper rotation of the planet gears. The second power path may include an attachment between the input carrier and a second ring gear 316. In turn, the ring gear may drive one or more downwind planet gears 318. Both the upwind and the downwind planet gears may drive a sun gear 320 forming an output of the transmission. Thus, the gear-train includes two power paths which drive a sun gear forming or coupled to an output, such as an output shaft. In some examples, the output may include a parallel stage shaft rotatably coupled to the output shaft. In other examples, alternate suitable transmissions may be used. Additional gears may also be included in the gear-train 304.

Furthermore, additional components may also be included in the transmission, such as a pitch tube 322. The pitch tube may transverse the transmission as well as house various conduits used to control the position of components in the wind turbine, such as the angle of the rotor blades. Additionally, a lubrication system (not shown) may be used to lubricate various components included in the transmission. Further still, a cooling system (not shown), such as an open or closed loop cooling system, may be included in the transmission.

Continuing with FIG. 3, the transmission 300 may receive rotational input from rotor blades and transfer the rotational input through the gear-train, as discussed above. A torque reacting joint 324, included in the transmission, may be configured to react the torque in the gear-train through generation of an equal and opposite reaction torque. The torque reacting joint may be compactly and efficiently designed, increasing the torque density, and enhancing the space saving features of the wind turbine.

In this example, the torque from the downwind planet gears 318 may be transferred to the torque reacting joint 324 through a carrier attachment 325. The torque reacting joint 324 may be included in the outer housing 302 of the transmission which may be fixedly coupled to a stationary component included in the nacelle, such as the bedplate 18, illustrated in FIG. 1, thereby reacting the torque in the gear-train. A suitable component, such as a housing flange 326, may couple the outer housing of the transmission to the bedplate. Various detailed views of the housing flange are further illustrated in FIGS. 4A, 4B, 5A, 5B, 10, and 11, discussed in greater detail herein. It can be appreciated that the torque reacting joint may be coupled to alternate or additional components in the transmission or wind turbine, such as the first ring gear 314, the transmission output including a parallel stage shaft (not shown), and/or a generator (not shown).

Due to installation requirements, an outer radius 330 of the torque reacting joint, as illustrated in FIG. 3, may be restricted. In particular, the outer radius of the torque reacting joint may not exceed the inner radius 328 of the housing flange 326, preventing interference of the inner torque reacting joint with the housing flange, allowing various tools, such as a drill or reamer head, to be inserted into the housing flange 326 during assembly, disassembly, and/or repair. Therefore, the installation process may be simplified when a compact and efficiently designed torque reacting joint is utilized, decreasing the cost of the wind turbine. Various detailed views of an example torque reacting joint are shown in FIGS. 4A-5B.

Specifically, FIG. 4A illustrates a more detailed view of the torque reacting joint 324 included in an outer housing 302. The torque reacting joint 324 may facilitate torque transfer from a carrier attachment 404 to a gear-train housing 406. In this example, carrier attachment 404 may be similar to carrier attachment 325. Further, in this example, the carrier attachment is coupled to one or more planet carriers, the planet carrier fixing rotation of the one or more planet gears, discussed in greater detail herein with regard to FIGS. 5A and 5B. In this example, the torque reacting joint is radially aligned in that the gear-train and the torque reacting joint have a common center axis 407, allowing for proper load distribution through the torque reacting joint with the gear-train housing positioned upwind of the carrier attachment. However, in other examples, the gear-train housing may be positioned downwind of the carrier attachment. Further, in this example, the gear-train housing encloses a substantial majority of the gear-train, reducing the likelihood of unwanted particulates entering the gear-train, as well as reducing leakage of lubrication fluid from the gear-train.

Continuing with FIG. 4A, the torque reacting joint may include mating indents 408 between the first and the second sections of the transmission (the carrier attachment and the gear-train housing, in this example), which may be circumferentially formed (meaning that the mating indents extend around the circumference of the torque reacting joint). The mating indents may include a contacted surface area. Various configurations of the mating indents 408 may be used, such as interference keys, splines, etc. Thus, in some examples, the indents in the torque reacting joint may be in the shape of splines. Further, in some examples, the indents may form an interference fit. As should be appreciated, the term "mating indent" refers to a structure that defines a recess in a first part (e.g., the first section of the transmission), which accommodates a correspondingly shaped protuberance in a second part (e.g., the second section of the transmission).

In this example, the mating indents 408 may include alternating projected and recessed portions, 410 and 412 respectively, allowing an increased amount of torque to be transferred between the first and the second sections of the transmission via the torque reacting joint, while maintaining a compact and efficient design, thereby increasing the torque density. In other examples, the mating indents may have alternate geometries. An exploded side view of the torque reacting joint is shown in FIG. 4B, illustrating the two section of the transmission coupled through the torque reacting joint.

Another exploded view of the torque reacting joint 324 is shown in FIGS. 5A and 5B, illustrating a more detailed view of the gear-train housing 406 and the carrier attachment 404, which may be coupled to form the torque reacting joint. Specifically FIGS. 5A and 5B illustrate a gear-train mating surface 502 and a housing mating surface 504. The aforementioned surfaces may be mated to form the mating indents of the torque reacting joint. The housing mating surface may further include alternating projected and recessed portions, 506 and 508 respectively, as shown in FIG. 5A. Additionally, the gear-train mating surface may further include alternating projected and recessed portions, 512 and 510 respectively, as shown in FIG. 5B.

FIG. 5A illustrates the housing mating surface 504, which may also include a plurality of cavities 514 extending into the gear-train housing 406. In this example, each projected and recessed portion may include a cavity positioned proximate to the geometric center of each respective projected portion and recessed portion. However, in other examples, the number and/or position of the cavities may be adjusted depending on various factors, such as design requirements. Further in this example, the cavities 514 extend axially, through the gear-train housing 406, parallel to the common central axis 407 (e.g., central axis of rotation) of the transmission, and may be sized to accept fasteners, such as coupling hardware (e.g., bolts, screws, rivets, or the like), discussed in more detail herein.

As illustrated in FIG. 5B, the gear-train mating surface 502 may also include a plurality of cavities 518, extending through the carrier attachment 404. In this example, each projected and recessed portion, 512 and 510 respectively, may include a cavity positioned proximate to the geometric center of each respective projected and recessed portion. However, in other examples the number and/or position of the cavities may be adjusted. The cavities extend axially, through the carrier attachment 404, parallel to the common central axis 407 of the transmission, and may be sized to accept fasteners, such as coupling hardware.

To facilitate torque transfer from the gear-train to the torque reacting joint 324, the carrier attachment 404 may be coupled to various components in the gear-train, as previously discussed. Therefore, in this example, as illustrated in FIG. 5B, the carrier attachment 404 may include a plurality of planet attachments 526, arranged around the central axis of rotation of the gear-train. The planet attachments 526 may be configured to fix the rotation of one or more planet gears included in the gear-train, shown in FIG. 3. One or more bearings or bearing sets may be coupled to the planet attachments, providing axial and/or radial support to the planet gears included in the gear-train as well as fixing the rotation of the planet gears. Suitable bearing types that may be used include cylindrical roller bearings, tapered roller bearings, or a combination thereof. In this example, the planet attachments are cylindrical. However, it can be appreciated that in other examples, the geometry and/or size of the planet attachments may be adjusted depending on various design specifications. Further, in other examples, the planet attachments may be configured to fix additional or alternate components included in the gear-train, such as a ring gear.

Returning to FIG. 5B, the carrier attachment 404 may include a central cavity 528. When the carrier attachment is assembled in the transmission the transmission's output (e.g., sun gear) may extend through the central cavity. The transmission output may include a central rotating shaft and/or a sun gear.

To facilitate torque transfer from the torque reacting joint 324 to the nacelle (e.g., bedplate) the transmission (e.g., the outer housing 302) may additionally include, in some examples, a housing flange 326, as previously discussed. The housing flange 326 includes a plurality of axially aligned flange cavities 530 extending through the entire housing flange. Suitable coupling hardware, such as bolts, screws, rivets, and the like, may be used to couple the flange to the stationary component, such as the bedplate. In this way, reaction torque from the outer housing may be transferred to the nacelle. Thus, the gear-train housing and the carrier attachment may be fixed components. In other examples, the housing flange 326 may be coupled to alternate suitable fixed components in the nacelle. Further still, in other examples, another suitable attachment mechanism, such as two or more torque arms, may be used to fixedly couple the outer housing 302 to a stationary component in the nacelle.

Figure 6A:
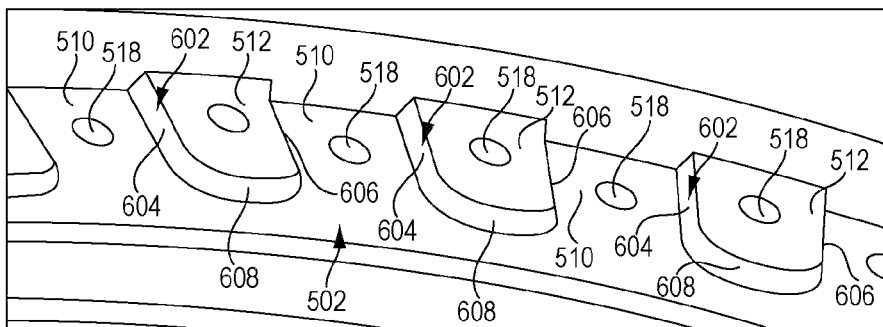
FIGS. 6A and 6B show a detailed view of a gear-train mating surface included in the torque reacting joint, shown in FIG. 5B.
Figure 6B:
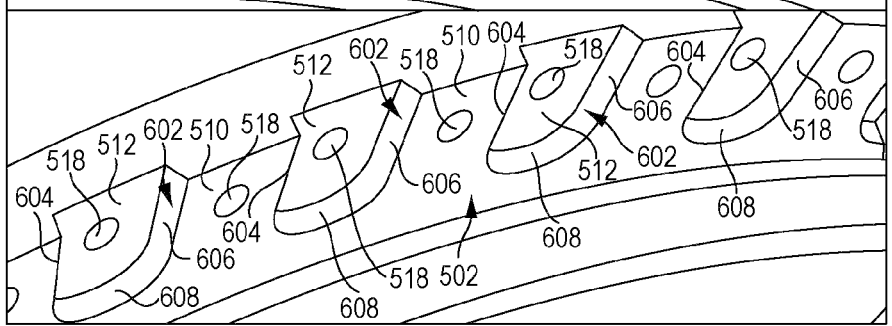
Figure 7A:
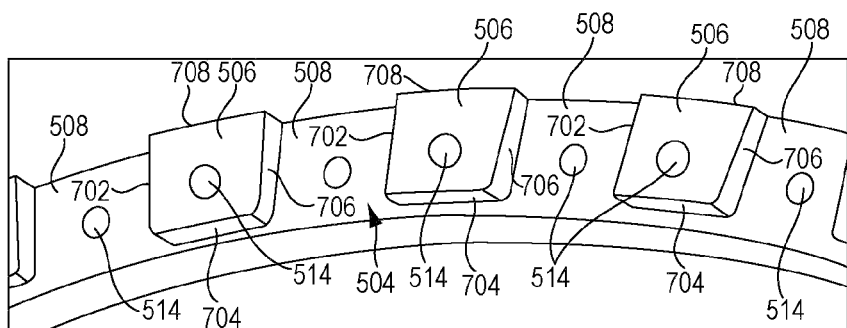
FIGS. 7A and 7B shows a detailed view of the housing mating surface, shown in FIG. 5A.
Figure 7B:
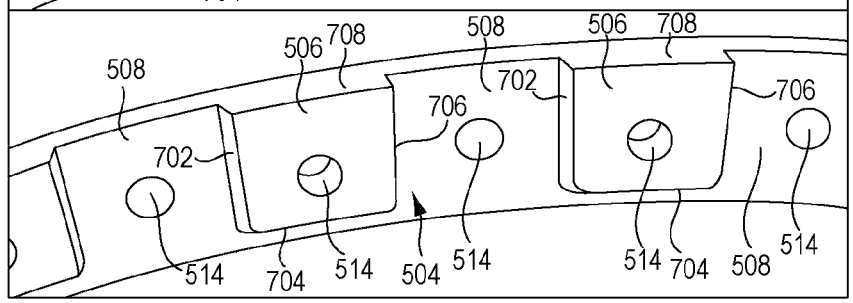

Detailed views of both of the mating surfaces, discussed above, are shown in FIG. 6A-7B, further illustrating the geometries of each mating surfaces (the housing mating surface and the gear-train mating surface in this example). Specifically, FIGS. 6A and 6B show a detailed view of the gear-train mating surface 502, shown in FIG. 5B, and FIGS. 7A-7B show a detailed view of the housing mating surface 504, shown in FIG. 5A. Therefore, similar parts are labeled accordingly.

As illustrated in FIGS. 6A-6B, the projected and recessed portions, 512 and 510 respectively, may be planar and axially offset. However, in other examples, the projected and/or recessed portions may be curved in a convex or concave manner. In this example, the gear-train mating surface is milled. However, in other examples, the gear-train mating surface may be cast, welded, etc.

Continuing with FIGS. 6A and 6B, the gear-train mating surface may further include, in some examples, a plurality of banks 602. Each bank may have three segments: two substantially straight segments, 604 and 606, and a curved segment 608. In some examples, the banks may be angled (e.g., tapered), discussed in more detail herein with regard to FIG. 8. The straight segments, 604 and 606, may be radially aligned with the central axis of rotation of the gear-train. Alternatively, in other examples, the straight segments may be parallel. Furthermore, the curved segment may be curved in suitable fashion, such as a parabolic curve, U-shaped curve, non-symmetric curve, etc. The radially alignment of the banks as well as the curved segment allows the mating indents to properly mate during operation of the wind turbine.

FIGS. 7A and 7B show a detailed view of the housing mating surface 504 included in the outer housing 302. To facilitate mating, the housing mating surface 504 may have a similar geometry to the gear-train mating surface 502. In this example, the projected and recessed portions (506 and 508 respectively), included in the housing mating surface, may be planar and axially offset. However, in other examples, the projected and/or recessed portions may be curved in a convex or concave manner. Further, in this example, the housing mating surface is milled. However, in other examples, the housing mating surface may be cast, welded, etc.

Continuing with FIGS. 7A and 7B, each of the projected portions 506, included in the housing mating surface 504, may include four banks (702, 704, 706, and 708). In this example, three of the banks (702, 704, and 706) are formed with an angle. The bank 708 may be axially aligned with the common central axis 407, illustrated in FIGS. 4A-5B. Returning to FIGS. 7A and 7B, in this example, the banks 702 and 706 are radially aligned. However, in other examples, the banks 702 and 706 may be parallel.

Figure 8:
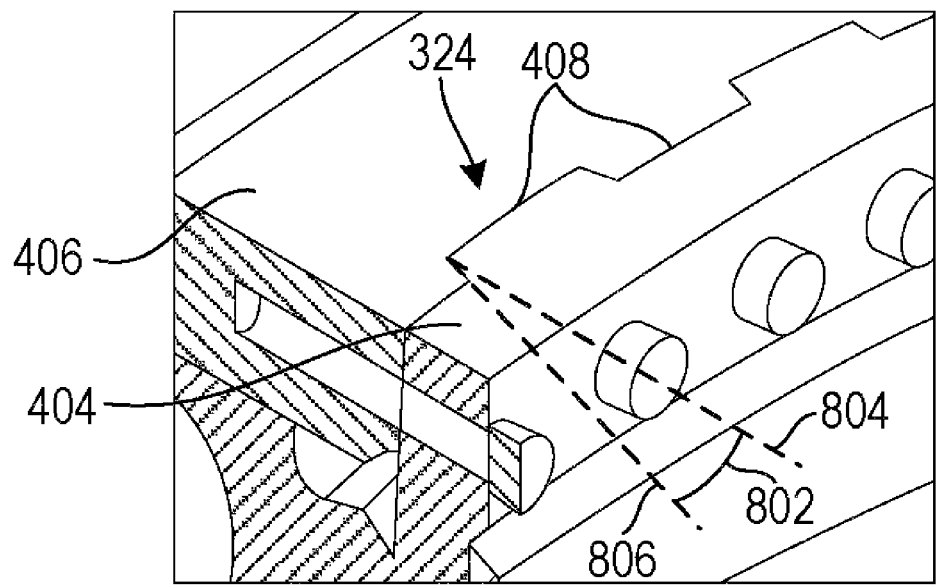
FIGS. 8-9 show various detailed views of the torque reacting joint illustrated in FIGS. 4A and 4B.

FIG. 8 illustrates a detailed view of the carrier attachment mated with the gear-train housing, forming the torque reacting joint having mating indents. The mating indents may be formed with an angle 802. In this example, the angle is oblique. However, it can be appreciated that in other examples, the angle may be radially aligned (e.g., perpendicular) with the central axis of rotation of the gear-train. The angle 802 may be defined as the angle of intersection between an axially aligned plane 804 and a plane 806 parallel to one of the banks (602, 706, 708, and 710). The angle 802 may be adjusted to allow other components to carry a portion of the torque as axial force, discussed in more detail herein. Various parameters may be taken into account when determining the angle such as the surface area of at least a portion of the mating surfaces, the component's size (e.g., diameter), and the material grade of the components and the mating surfaces. In some examples, the angle 802 may be between 6° and 30°, that is, $6° \leq (\text{angle } 802) \leq 30°$.

Figure 9:
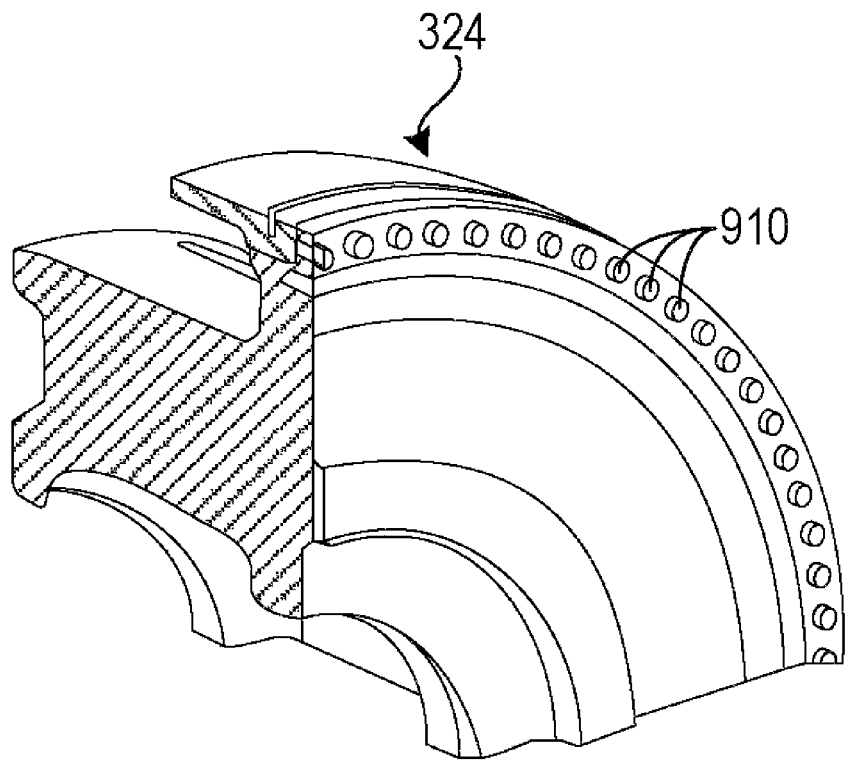
Figure 11:
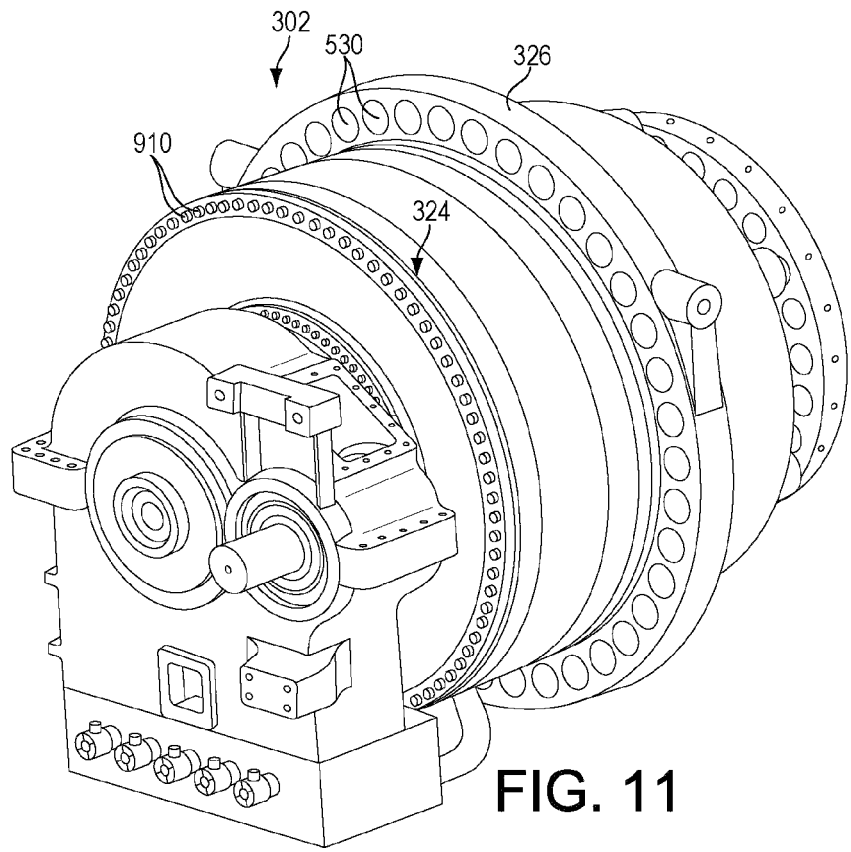

The cavities included in both the housing mating surface and the gear-train mating surface, 504 and 502 respectively, discussed above, may be correspondingly positioned to allow fasteners 910 to be inserted axially through each cavity, when the torque reacting joint is formed through mating of the mating surfaces. Exemplary illustrations of the torque reacting joint including the fasteners are shown in FIGS. 9 and 11. Suitable fasteners that may be used include bolts, screws, and rivets. In some examples, the fasteners may be 3/4 inch (M20) bolts. However, it can be appreciated that in other examples the size of the fasteners may be adjusted or the fasteners may not be included in the torque reacting joint.

Due to manufacturing tolerances, such as machining tolerances, a portion of the mating surfaces (e.g., housing mating surface and the gear-train mating surface) may not be in contact. Therefore, in some examples, the fasteners may be flexible, allowing the contacted surface area to be increased. Specifically, in this example, the fasteners may be configured to flex to a greater degree than the mating indents. The size, geometry, and/or material composition of the torque reacting joint as well as the fasteners may be adjusted to create the desired flexibility in the mating indents and the fasteners. Thus, during operation of the gear-train, the fasteners may deform, allowing the mated surface of the torque reacting joint to evenly distribute the loads transferred through the torque reacting joint 324 via increased contacted surface area. In this way, the stress on various portions of the mating indents may be decreased, thereby increasing the lifespan of the torque reacting joint. In some examples, the fasteners may be used for tension loading only. However, in other examples, the fasteners may provide support for both the tension and the shear loading.

Figure 10:
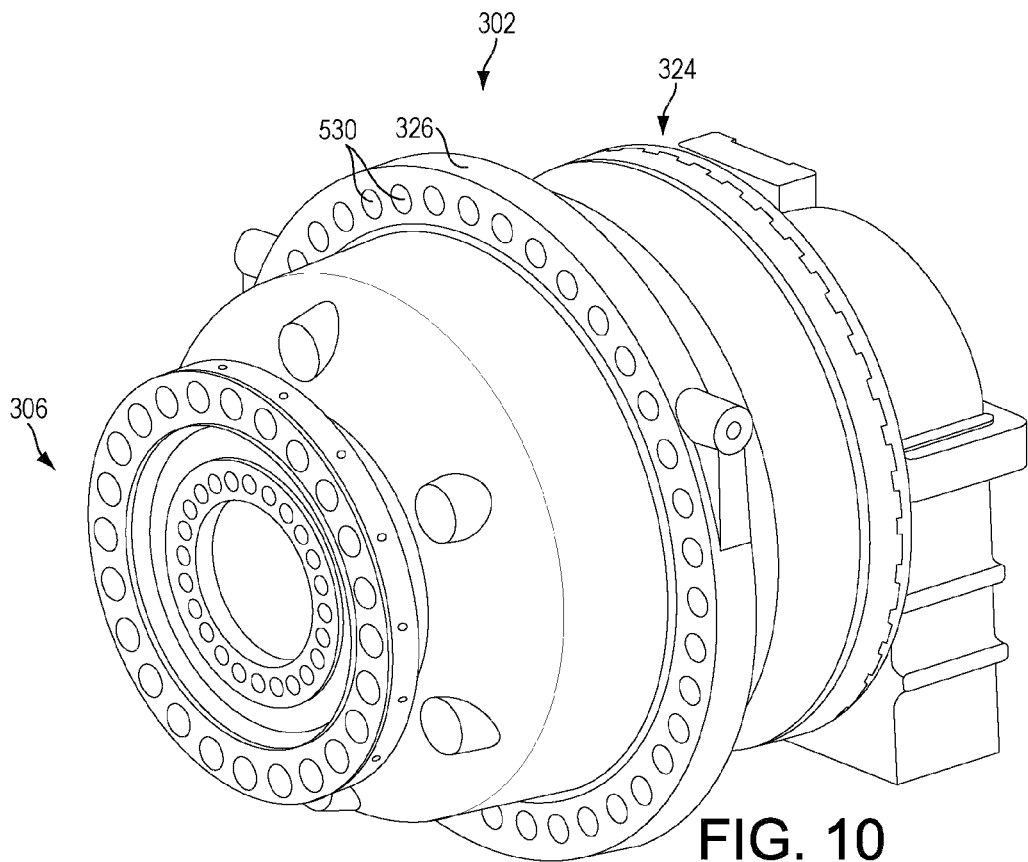
FIGS. 10 and 11 illustrate various isometric view of the transmission, shown in FIG. 3.

FIGS. 10 and 11 show various isometric views of the assembled transmission and generator. Similar parts are labeled accordingly.

In one example, the wind driven power generation system, discussed above, may include the mating indents 408 having a first mating surface (e.g., the housing mating surface 504) and a second mating surface (e.g., the gear-train mating surface 502) having a contacted surface area. Further, in this example, the first and second mating surfaces may have axially offset and radially aligned projected and recessed planar surfaces (e.g., 510, 512, 506, and 508), obliquely angled banks (e.g., 608, 702, 704, 706) joining the projected and recessed planar surfaces, and centrally positioned cavities (e.g., 514 and 518). The centrally positioned cavities may extend through each of the first and second mating surfaces. Additionally, the cavities may be configured to accept fasteners which may be configured to flex to a greater degree than the contacted surface area of the mating indents.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A transmission, comprising:
a gear-train; and
an outer housing enclosing the gear-train, the outer housing including a torque reacting joint coupling a first section of the transmission to a second section of the transmission, the torque reacting joint including mating indents between the first and second sections, each of the mating indents including a cavity having a fastener extending therethrough to couple the first section and the second section.

2. The transmission of claim 1, wherein the torque reacting joint forms an interference fit, and where the fasteners are configured to flex to a greater degree than the interference fit of the torque reacting joint.

3. The transmission of claim 1, wherein the mating indents are formed with an oblique angle.

4. The transmission of claim 1, wherein the mating indents comprise a plurality of alternating projected portions and recessed portions that extend around a circumference of the torque reacting joint, where each of the projected portions and each of the recessed portions has a cavity through which a fastener extends to couple the first section and the second section.

5. The transmission of claim 1, wherein the housing is an outer gear-train housing of a wind driven turbine transmission.

6. The transmission of claim 5, wherein the torque reacting joint reacts torque produced by rotor blades driven by wind.

7. The transmission of claim 5, wherein the mating indents are formed by mating surfaces of the first and second sections.

8. The transmission of claim 7, wherein the mating surface of the first section is upwind of the mating surface of the second section.

9. The transmission of claim 7, wherein the mating surfaces are correspondingly tapered.

10. The transmission of claim 7, wherein the mating indents are circumferentially formed around the mating surfaces of the first and second sections.

11. The transmission of claim 10, wherein the gear-train includes a planetary transmission including an input carrier, sun gear, ring gear, and planet gear.

12. A wind driven power generation system, comprising:
a nacelle including a bedplate;
a rotor having a plurality of blades configured to be driven by wind; and
a transmission including an input and an output, the transmission input coupled to the rotor, the transmission including a planetary gear-train enclosed by an outer housing, the outer housing including a torque reacting joint coupling a first section of the outer housing to a second section of the outer housing, the torque reacting joint including mating indents between the first and second sections, each of the mating indents including a cavity having a fastener extending therethrough to couple the first section and the second section, where the first section is fixedly coupled to a carrier of planetary gear-train, and the second section is fixedly mounted to the bedplate.

13. The wind driven power generation system of claim 12, where the fasteners are configured to flex to a greater degree than the mating indents.

14. The wind driven power generation system of claim 12, wherein the torque reacting joints reacts torque produced by the rotor blades driven through the bedplate.

15. The wind driven power generation system of claim 12 wherein the mating indents form an interference fit.

16. The wind driven power generation system of claim 12, wherein the mating indents are formed in mating surfaces of the first and second sections, and where the mating indents are circumferentially formed around the mating surfaces of the first and second sections.

17. The wind driven power generation system of claim 16, wherein the mating indents are formed with an angle.

18. The wind driven power generation system of claim 16, wherein the mating indents include a first mating surface and a second mating surface having a contacted surface area, the first and second mating surfaces having axially offset and radially aligned projected and recessed planar surfaces, and obliquely angled banks joining the projected and recessed planar surfaces, and where the cavities are centrally positioned to extend through each of the first and second mating surfaces, and the fasteners are configured to flex to a greater degree than the contacted surface area of the mating indents.

19. A wind driven power generation system, comprising:
a nacelle including a bedplate;
a rotor having a plurality of blades configured to be driven by wind; and
a transmission including an input and an output, the transmission input coupled to the rotor, the transmission including a planetary gear-train enclosed by an outer housing, the outer housing including a torque reacting joint coupling a first section of the outer housing to a second section of the outer housing, the torque reacting joint including mating indents between the first and second sections, where the indents include alternating projected portions and recessed portions with an obliquely angled surface between the projected and recessed portions, the transmission further including fasteners extending axially through the mating indents;
wherein the first section is fixedly coupled to a carrier included in the planetary gear-train, and the second section is fixedly mounted to the bedplate.

20. The wind driven power generation system of claim 19, wherein the indents are formed as splines.

21. The wind driven power generation system of claim 19 wherein the outer housing includes a flange extending outward, and where an outer diameter of the mating indents does not interfere with an inner diameter of the flange.

* * * * *